Patented Apr. 21, 1931

1,802,055

UNITED STATES PATENT OFFICE

HANS JORDAN, OF BERLIN-STEGLITZ, WALTER SCHOELLER, OF BERLIN-WESTEND, AND REINHARD CLERC, OF BERLIN, GERMANY, ASSIGNORS TO THE FIRM: SCHERING-KAHLBAUM AKTIENGESELLSCHAFT, OF BERLIN, GERMANY

METHOD OF PRODUCING MENTHOL AND ITS ISOMERS

No Drawing. Application filed August 15, 1927, Serial No. 213,207, and in Germany November 16, 1926.

Our invention refers to chemical products and more especially to phenolic bodies and to the method of making same.

Our invention is based on the discovery disclosed in the copending applications for patent of the United States, filed June 20, 1927, by Hans Jordan alone and with Walter Schoeller jointly, respectively, Serial Nos. 200,290, 200,289, 200,298, and 200,297, that the products resulting in the condensation of alkyl phenols and ketones, for instance by heating cresols with ketones of about 40° C. in the presence of hydrochloric acid as condensing agent, if decomposed at elevated temperature and thereafter or simultaneously subjected to hydrogenation in the presence of suitable catalysts, will be converted into thymol, its isomers or homologues, or into the corresponding hexahydro compounds including menthol, according to the number of hydrogen atoms which have entered into combination, and that hydrogenation could be effected at lower temperature, if besides the catalyst ordinarily used for hydrogenation another catalyst is present which is capable of depressing the temperature of decomposition of the condensation products.

We have now found by experiment that simultaneous decomposition and hydrogenation of these condensation products as well as of other ether-like condensation products such as described for instance by Gaebel (Ueber Kondensationsprodukte aus m-Kresol und p-Kresol mit Aceton, Dissertation Marburg, 1903) and by Dianin (Berichte 25, Referate 334) and of other ether-like compounds in general, including mixed and more especially cyclic ethers, such as cumaranes, can be brought about in a particularly effective manner, if the operation is carried through at a higher temperature than usual in this kind of hydrogenation processes. As is well known, hydrogenation of phenols, naphthalene and similar compounds is effected at temperatures not exceeding 180° C. in maximo.

In contradistinction thereto we have found that if the condensation products aforementioned or described in Hans Jordan's copending application Serial No. 200,289 are treated with hydrogen under pressure in the presence of a catalyst, the temperature being raised to about 280° C., the molecules will be readily decomposed at one or several ether linkage points and at the same time the unsaturated side chain will take up hydrogen, if desired, even up to the formation of hexahydro compounds.

We have further found that the reaction will be expedited and will occur at considerably lower temperature, for instance between 190 and 230° C., if a suitable diluent, for instance menthane, is present, a mixture of thymol or menthol and cresol being for instance formed in this case.

We have also ascertained that the mixed and more especially cyclic ethers, for instance the cumaranes, will already be decomposed at a temperature of about 200° C.

Example 1

The condensation product from m-cresol and acetone described in Hans Jordan's copending application Serial No. 200,289, is treated in the presence of a nickel catalyst under pressure and at a temperature of about 180° C. with hydrogen, until 4 atoms hydrogen have entered into combination. There results 3-methyl-6-isopropyl phenol (thymol).

Example 2

By treating in a similar manner the condensation product from p-cresol and acetone, 4-methyl-6-isopropyl phenol (p-thymol) is obtained.

Example 3

The condensation product from m-cresol and acetone, which is obtained by condensation with hydrochloric acid at about 40° C., is treated in the presence of a nickel catalyst with hydrogen under pressure at a temperature of about 180° C., until 16 hydrogen atoms have been combined. There results a mixture of menthol and its stereoisomers according to the equation:

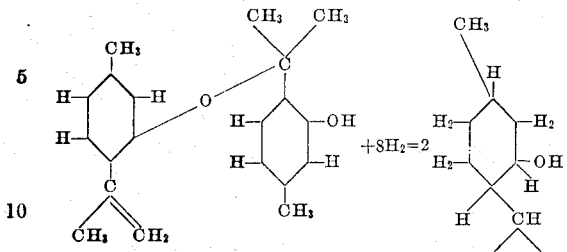

Example 4

The condensation product obtained by condensing p-cresol and acetone in the presence of hydrochloric acid at about 40° C., is hydrogenated as described with reference to Example 1, until 16 hydrogen atoms have been combined. There results a mixture of p-menthol and its steroisomers according to the equation:

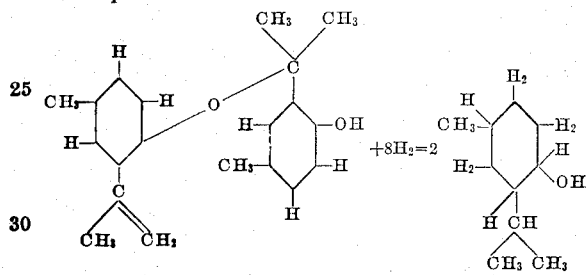

Example 5

The ether-like condensation product from m-cresol and acetone described by Gaebel supra is treated at 250–280° C. in the presence of a catalyst with hydrogen, until 16 hydrogen atoms have been combined. There results a mixture of menthol and its isomers according to the equation:

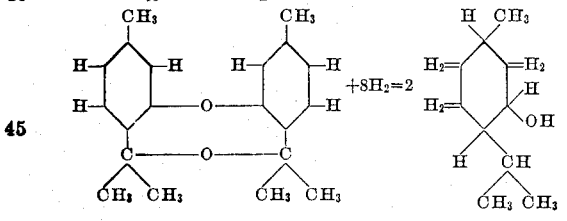

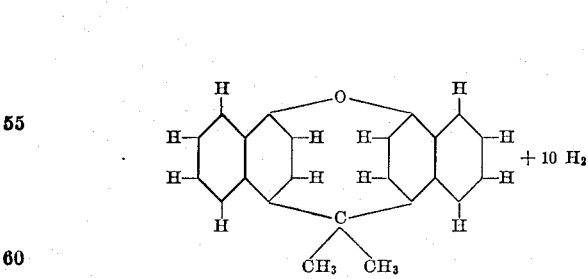

Example 6

By treating the ether-like condensation product obtained according to Gaebel from p-cresol and acetone as described with reference to Example 5, there is obtained a mixture of the several stereoisomers of 4-methyl-2-isopropyl cyclohexanols according to the equation:

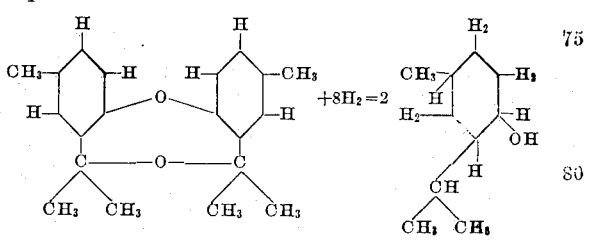

Example 7

If dimethyl cumarene (described in the copending application Serial No. 200,291) is treated at 235–250° C. with hydrogen in the presence of a mixed catalyst containing the carbonates of Ni, Co, and Cu or other heavy metals, until 8 hydrogen atoms have been combined, there results menthol and its isomers according to the equation:

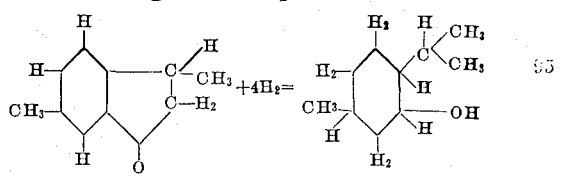

Example 8

The product of condensation from α-naphthol and acetone described by Dianin supra is treated at 280–320° C. with hydrogen in the presence of a mixed catalyst containing nickel. There results, according to the number of hydrogen atoms which have been taken up, a mixture of isopropyl dekahydronaphthol, dekahydronaphthalene, isopropyl dekahydronaphthalene, dekahydronaphthol and the corresponding tetrahydro-derivatives, the reaction proceeding in two directions as shown by the arrows in the equation:

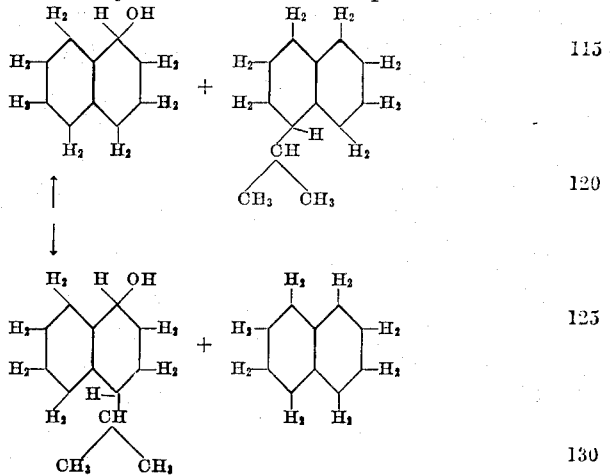

While it is important that the temperature be maintained above the temperature usually employed in hydrogenation processes, the pressure has no influence on the reaction itself, but only on the time required for the carrying through of the process. It is to be understood that the pressure must be so high as to exceed the vapor tension of the final products to be obtained and, if the catalysts used have not been previously reduced, the vapor tension of the catalyst water formed at the respective temperature. It has surprisingly been found that mixed and more especially cyclic ethers such as for instance the cumaranes can be brought to react far more readily in the manner described, so that in this case a temperature of about 200° C. will suffice to decompose the ether-like compounds, while in other cases the temperature must be raised above 280° C.

Various changes may be made in the details disclosed in the foregoing specification without departing from the invention or sacrificing the advantages thereof.

We claim:—

1. The method of producing isoalkyl hexahydrocyclohexanols comprising acting with hydrogen under pressure in the presence of a hydrogenation catalyst on an ether-like product of condensation (prepared at a temperature between 20 and 100° C. in the presence of gaseous hydrochloric acid) of an alkyl phenol and a ketone, at a temperature between 180 and 320° C. until 16 hydrogen atoms have entered into combination.

2. The method of producing menthol and its isomers comprising acting with hydrogen under pressure in the presence of a hydrogenation catalyst on an ether-like product of condensation (prepared at a temperature between 20 and 100° C. in the presence of gaseous hydrochloric acid) of m-cresol and acetone, at 180–320° C. until 16 hydrogen atoms have entered into combination.

3. The method of producing menthol and its isomers comprising acting with hydrogen under pressure in the presence of a hydrogenation catalyst on an ether-like product of condensation (prepared at a temperature between 20 and 100° C. in the presence of gaseous hydrochloric acid) of m-cresol and acetone, at a temperature of about 280° C., until 16 hydrogen atoms have entered into combination.

4. The method of producing menthol and its isomers comprising acting with hydrogen under pressure in the presence of a diluent and a hydrogenation catalyst on an ether-like product of condensation (prepared at a temperature between 20 and 100° C. in the presence of gaseous hydrochloric acid) of m-cresol and acetone, at a temperature of about 280 C., until 16 hydrogen atoms have entered into combination.

5. The method of producing menthol comprising acting with hydrogen under pressure in the presence of a hydrogenation catalyst on an ether-like product of condensation (prepared at a temperature between 20 and 100° C. in the presence of gaseous hydrochloric acid) of m-cresol and acetone, at a temperature of about 280° C., until 16 hydrogen atoms have entered into combination.

6. The method of producing menthol comprising acting with hydrogen under pressure in the presence of a diluent and a hydrogenation catalyst on an ether-like product of condensation (prepared at a temperature between 20 and 100° C. in the presence of gaseous hydrochloric acid) of m-cresol and acetone, at a temperature of about 280° C., until 16 hydrogen atoms have entered into combination.

7. The method of producing menthol comprising acting with hydrogen under pressure in the presence of a hydrogenation catalyst and menthane on an ether-like product of condensation (prepared at a temperature between 20 and 100° C. in the presence of gaseous hydrochloric acid) of m-cresol and acetone, at a temperature of about 280° C., until 16 atoms hydrogen have entered into combination.

In testimony whereof we affix our signatures.

HANS JORDAN.
WALTER SCHOELLER.
REINHARD CLERC.